United States Patent
Chang

(10) Patent No.: US 11,556,586 B2
(45) Date of Patent: Jan. 17, 2023

(54) SOUND RECOGNITION MODEL TRAINING METHOD AND SYSTEM AND NON-TRANSITORY COMPUTER-READABLE MEDIUM

(71) Applicant: WISTRON CORP., New Taipei (TW)

(72) Inventor: Hsuan Tsung Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 198 days.

(21) Appl. No.: 17/167,215

(22) Filed: Feb. 4, 2021

(65) Prior Publication Data

US 2022/0114208 A1     Apr. 14, 2022

(30) Foreign Application Priority Data

Oct. 14, 2020   (TW) ................... 109135541

(51) Int. Cl.
  *G06F 16/65*     (2019.01)
  *G06N 20/00*    (2019.01)
  *G06F 16/683*   (2019.01)

(52) U.S. Cl.
  CPC ............ *G06F 16/65* (2019.01); *G06F 16/683* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 9,711,138 B2 | 7/2017 | Zhang | |
| 9,842,605 B2 | 12/2017 | Lu et al. | |
| 10,733,999 B2 | 8/2020 | Dick et al. | |
| 10,803,879 B2 | 10/2020 | Lu et al. | |
| 2008/0208538 A1 | 8/2008 | Visser et al. | |
| 2011/0208521 A1 | 8/2011 | McClain | |
| 2019/0272318 A1 | 9/2019 | Suzuki et al. | |
| 2019/0362712 A1* | 11/2019 | Karpukhin | .............. G06F 40/30 |

FOREIGN PATENT DOCUMENTS

| | | |
|---|---|---|
| CN | 104078050 A | 10/2014 |
| TW | 200849219 A | 12/2008 |
| TW | I532035 B | 5/2016 |
| TW | 201740368 A | 11/2017 |

OTHER PUBLICATIONS

TW Office Action dated Apr. 23, 2021 in Taiwan application (No. 109135541).

* cited by examiner

*Primary Examiner* — Walter F Briney, III
(74) *Attorney, Agent, or Firm* — McClure, Qualey & Rodack, LLP

(57) ABSTRACT

A sound recognition model training method comprises determining a relationship between a sound event and first parameter and deciding a second parameter in response to the relationship, performing sampling on the sound event using the first parameter and the second parameter to generate training audio files, and inputting at least part of the training audio files to a sound recognition model for training the sound recognition model, wherein a length of each of the training audio files is associated with the first parameter, a time difference between every two of the training audio files is associated with the second parameter, and the sound recognition model is used for determining a sound classification.

19 Claims, 5 Drawing Sheets

SOUND RECOGNITION MODEL TRAINING METHOD AND SYSTEM AND NON-TRANSITORY COMPUTER-READABLE MEDIUM

CROSS-REFERENCE TO RELATED APPLICATIONS

This non-provisional application claims priority under 35 U.S.C. § 119(a) on Patent Application No(s). 109135541 filed in Taiwan (ROC) on Oct. 14, 2020, the entire contents of which are hereby incorporated by reference.

BACKGROUND

1. Technical Field

This present application relates to a recognition model training method, and particularly to a sound recognition model training method.

2. Related Art

There are various classifications of sounds in our living environment or work environment, and different sounds may represent the occurrence of different events. Therefore, sound recognition technology can be helpful in determining the conditions of the living environment or work environment, such as determining the occurrence of abnormal events. In Detection and Classification of Acoustic Scenes and Events (DCASE) held in 2017, the method for obtaining and processing training audio files proposed by the contestant who won the first place is to decompose a sound event into detailed characteristics and add time-related characteristics therein. However, this method belongs to large-scale deep learning that has a high specification, and its cost is accordingly high.

Furthermore, a fixed-length sampling shift is used in the conventional sampling method for obtaining training audio files from the sound event of which the length of time is longer than the length of a sampling unit, so the longer the sound event is processed by sampling, the more training audio files will be obtained, causing the repetitiveness of the training audio files to be too high, and thus, the built recognition model will be too concentrated on a specific classification of sounds. As for the conventional sampling method for obtaining training audio files from the sound event of which the length of time is shorter than the length of a sampling unit, the sound event is duplicated to compensate for the insufficient length of time of a training audio file. In this way, the obtained training audio files will contain many identical and continuous sound events, which changes the original characteristic distribution and may result in a decrease of precision of subsequent recognition.

SUMMARY

Accordingly, this present application provides sound recognition model training method and system.

According to one or more embodiments of this present application, a sound recognition model training method comprises determining a relationship between a sound event and first parameter and deciding a second parameter in response to the relationship, performing sampling on the sound event using the first parameter and the second parameter to generate training audio files, and inputting at least part of the training audio files to a sound recognition model for training the sound recognition model, wherein a length of each of the training audio files is associated with the first parameter, a time difference between every two of the training audio files is associated with the second parameter, and the sound recognition model is used for determining a sound classification.

According to one or more embodiments of this present application, a sound recognition model training system, comprises an audio capture device, and a processing device and a storage device, wherein the processing device is connected with the audio capture device and the storage device. The audio capture device is configured for capturing a sound event. The processing device is configured for determining a relationship between a sound event and first parameter and deciding a second parameter in response to the relationship, performing sampling on the sound event using the first parameter and the second parameter to generate training audio files, and inputting at least part of the training audio files to a sound recognition model for training the sound recognition model, wherein a length of each of the training audio files is associated with the first parameter, a time difference between every two of the training audio files is associated with the second parameter, and the sound recognition model is used for determining a sound classification. The storage device is configured for storing the sound recognition model.

According to one or more embodiments of this present application, a non-transitory computer-readable medium, comprises a code, wherein the code is executed by a processor to perform: determining a sound classification according to a sound recognition model, wherein the sound recognition model is trained by the sound recognition model training method in the above-mentioned embodiment.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
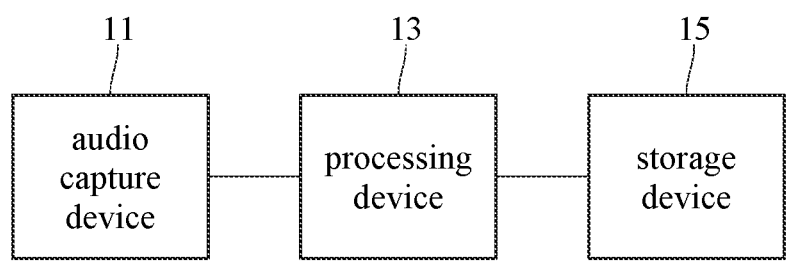
FIG. 1 is a function block diagram of a sound recognition model training system according to an embodiment of this present application.

A sound recognition model training system and a sound recognition model training method are provided in this present application for building a sound recognition model associated with a specific classification of sound events. Said specific classification is, for example, baby crying, dog barking, screaming, speaking, vehicle horn, alarm, gunshot, glass breaking, etc. Please refer to FIG. 1, which is a function block diagram of a sound recognition model training system according to an embodiment of this present application. As shown in FIG. 1, the sound recognition model training system 1 comprises an audio capture device 11, a processing device 13 and a storage device 15, wherein the processing device 13 is connected with the audio capture device 11 and the storage device 15 in a wired or wireless manner.

The audio capture device 11 is configured for obtaining a raw audio file. For example, the audio capture device 11 comprises a wired transmission port such as USB, micro USB, etc., or a wireless transmission port such as Bluetooth transceiver, WIFI transceiver, etc., for receiving a raw audio file from other device. As another example, the audio capture device 11 comprises a sound recorder which can record sound from the outside to generate a raw audio file. In an embodiment, the audio capture device 11 transmits the raw audio file to the processing device 13 as a sound event. In another embodiment, besides the audio input components (such as the above-mentioned transmission port or sound recorder), the audio capture device 11 further comprises a processor such as central processing unit (CPU), microcontroller, programmable logic controller (PLC), etc., for processing the raw audio file to generate a sound event.

The processing device 13 can be a processor or an electronic device including a processor. For example, the processor is CPU, microcontroller, PLC, etc. The processing device 13 can obtain the sound event from the audio capture device 11, perform pre-processing on the sound event to generate training audio files, and then input at least part of the training audio files into a sound recognition model for training the sound recognition model. The procedure of the pre-processing is described later. In an embodiment, the processing device 13 can include processors that respectively perform the pre-processing of the sound event and the training of the training audio files.

The storage device 15 can include one or more non-volatile memory components, such as flash memory, read-only memory (ROM), magnetoresistive random access memory (MRAM), etc. The storage device 15 can store the sound recognition model built by the processing device 13. In an embodiment, the storage device 15 and the processing device 13 can be set in the same host. In another embodiment, the storage device 15 can be set in a cloud server, and the processing device 13 can upload the sound recognition model to the storage device 15 via a wireless network. More particularly, the cloud server can provide sound recognition service using the sound recognition model. The cloud server can receive the sound input to be recognized, use the sound recognition model for recognition of the sound input, and send the recognition result to the user device (e.g. mobile phone) that have the corresponding application downloaded from the cloud server in the form of notification or alert.

Figure 2:
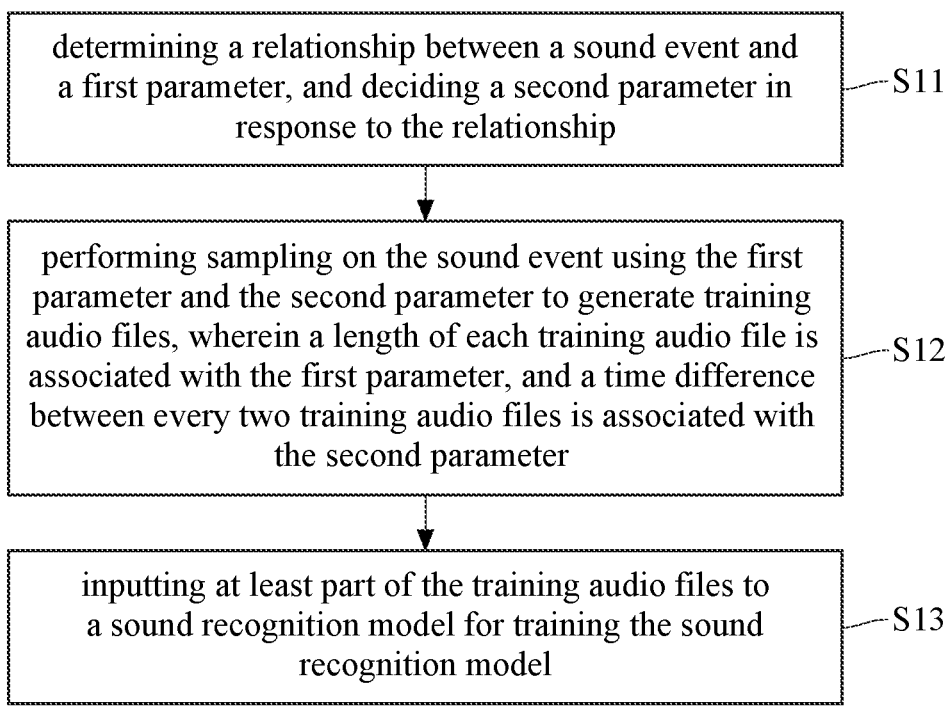
FIG. 2 is a flow chart of a sound recognition model training method according to an embodiment of this present application.

Please refer to FIG. 1 and FIG. 2, wherein FIG. 2 is a flow chart of a sound recognition model training method according to an embodiment of this present application. As shown in FIG. 2, a sound recognition model training method can comprise step S11: determining a relationship between a sound event and a first parameter, and deciding a second parameter in response to the relationship; step S12: performing sampling on the sound event using the first parameter and the second parameter to generate training audio files, wherein a length of each training audio file is associated with the first parameter, and a time difference between every two training audio files is associated with the second parameter; and step S13: inputting at least part of the training audio files to a sound recognition model for training the sound recognition model, wherein the sound recognition model is used for determining a sound classification. The sound recognition model training method shown in FIG. 2 can be applied to the sound recognition model training system 1 shown in FIG. 1. More particularly, the sound recognition model training system 1 can obtain a sound event by the audio capture device 11, perform steps S11-S13 to obtain training audio files for training a sound recognition model from the sound event by the processing device 13, and store the sound recognition model by the storage device 15. However, the sound recognition model training method shown in FIG. 2 is not limited to being performed by the system shown in FIG. 1.

Figure 3:
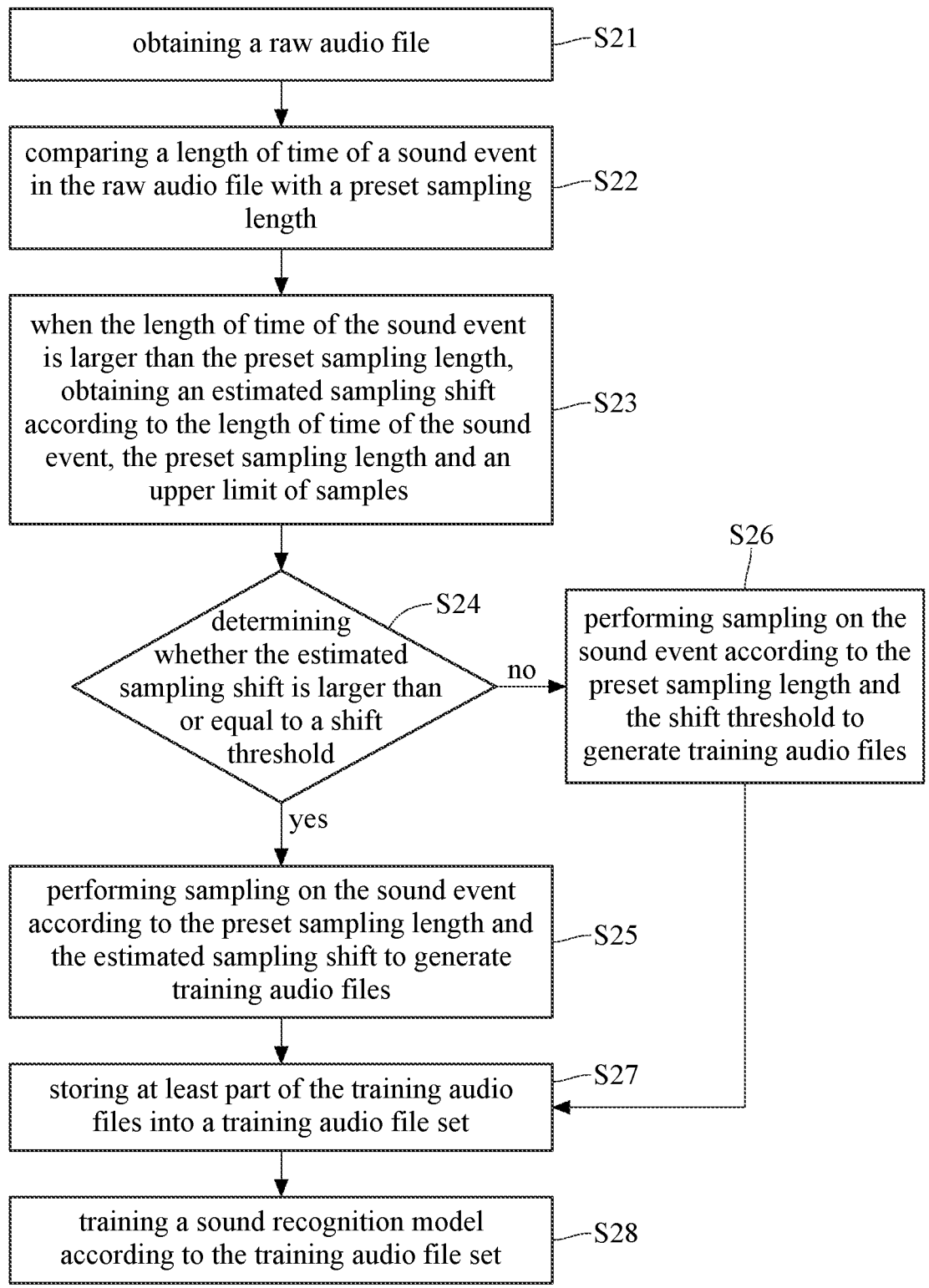
FIG. 3 is a flow chart of a sound recognition model training method according to another embodiment of this present application.

Please refer to FIG. 1, FIG. 2 and FIG. 3, wherein FIG. 3 is a flow chart of a sound recognition model training method according to another embodiment of this present application. As shown in FIG. 3, a sound recognition model training method can comprise step S21: obtaining a raw audio file; step S22: comparing a length of time of a sound event in the raw audio file with a preset sampling length; step S23: when the length of time of the sound event is larger than the preset sampling length, obtaining an estimated sampling shift according to the length of time of the sound event, the preset sampling length and an upper limit of samples; step S24: determining whether the estimated sampling shift is larger than or equal to a shift threshold; when the determined result is "yes", performing step S25: performing sampling on the sound event according to the preset sampling length and the estimated sampling shift to generate training audio files; when the determined result is "no", performing step S26: performing sampling on the sound event according to the preset sampling length and the shift threshold to generate training audio files; step S27: storing at least part of the training audio files into a training audio file set; and step S28: training a sound recognition model according to the training audio file set.

In particular, the steps of the sound recognition model training method shown in FIG. 3 can be the detailed implementation of the steps of the sound recognition model training method shown in FIG. 2. More particularly, determining the relationship between the sound event and the first parameter in step S11 in FIG. 2 can be implemented by step 22 in FIG. 3, wherein a preset sampling length serves as the first parameter; deciding the second parameter in response to the relationship between the sound event and the first parameter in step S11 in FIG. 2 can include step S23, step S24 and a step of using the estimated parameter (estimated sampling shift) as the second parameter when the estimated parameter is larger than or equal to the shift threshold, and in addition, when the estimated parameter is less than the shift threshold, step S11 in FIG. 2 further include using the shift threshold as the second parameter; step 12 in FIG. 2 can be implemented by step S25 or step S26 in FIG. 3; step S13 in FIG. 2 can be implemented by step S27 and step S28 in FIG. 3, wherein the training audio file set is optional, and the sound recognition model can be trained directly using part of the training audio files or all of them.

The sound recognition model training method shown in FIG. 3 is applied to the sound recognition model training system 1 shown in FIG. 1. In the following, multiple implementations of the sound recognition model training method are described to be performed by the sound recognition model training system 1. However, the sound recognition model training method of this present application is not limited to being implemented by the system shown in FIG. 1.

In step S21, the audio capture device 11 obtains a raw audio file. As aforementioned, the audio capture device 11 can receive a raw audio file from other devices or record sound from the outside to generate a raw audio file. The processor of the audio capture device 11 can extract a sound event from the raw audio file, and transmits the sound event to the processing device 13 for subsequent judgment.

More particularly, in an implementation, a raw audio file from one other device can have the start and end tags of one or more sound events that were previously marked by the device after the device analyzed the raw audio file, or previously marked by the user. The audio capture device 11 can extract the sound event according to the start and end tags. In another implementation, the internal memory of the audio capture device 11 can store templates of various classifications of sound events (e.g. sound waveforms respectively corresponding to various classifications of sound events, wherein said classifications are, for example, baby crying, dog barking, screaming, speaking, vehicle horn, alarm, gunshot, glass breaking, etc.). The processor of the audio capture device 11 can determine that a sound clip in the raw audio file matches to the template of a specific sound event and consider this sound clip to be a sound event. In yet another embodiment, the audio capture device 11 transmits the entire raw audio file as a sound event to the processing device 13 for the subsequent judgment.

In step S22, the processing device 13 determines the length of time of the sound event received from the audio capture device 11, and compares the length of time of the sound event and a preset sampling length. In particular, since the training audio files are be transformed to frequency domain by Fourier transform during subsequent training, the preset sampling length is preferably set to a power of 2. Moreover, the preset sampling length can be set to different values according to whether the sound event belongs to long tones or short tones, wherein the classifications of the long tones can include baby crying, dog barking, screaming, speaking, etc., and the classifications of the short tones can include alarm, vehicle horn, gunshot, glass breaking, etc. More particularly, when the sound event belongs to the long tones, the preset sampling length is set to a first value, and when the sound event belongs to the short tones, the preset sampling length is set to a second value, wherein the first value is larger than the second value. For example, when the sound event belongs to the long tones, the preset sampling length is set to 4, and when the sound event belongs to the short tones, the preset sampling length is set to 1. The preset sampling length can be set by a user through a user interface of the sound recognition model training system 1, or the processing device 13 of the sound recognition model training system 1 can determine whether the sound event belongs to the long tones or the short tones and then set the preset sampling length according to the determined result.

The way to determine whether the sound event belongs to the long tones or the short tones performed by the processing device 13 is further described in the following. In an embodiment, the processing device 13 can determine whether the sound event belongs to the long tones or the short tones according to the length of time of the sound event. For example, the processing device 13 determines that the sound event belongs to the short tones when the length of time of the sound event is equal to or shorter than 2 seconds, and determines that the sound event belongs to the long tones when the length of time of the sound event is longer than 2 seconds. In another embodiment, besides the start and end tags of the sound event, the raw audio file further includes a tag indicating whether the sound event belongs to the long tones or the short tones, and the processing device 13 can set the preset sampling length according to this tag. In yet another embodiment, the internal memory of the processing device 13 stores a lookup table indicating whether each of various classifications of sound events belongs to the long tones or the short tones. Besides the start and end tags of the sound event, the raw audio file further includes a tag indicating the classification of the sound event, and the processing device 13 can determine whether the classification of the sound event belongs to the long tones or the short tones according to this tag and the above-mentioned lookup table, and accordingly set the preset sampling length. In yet another embodiment, the internal memory of the processing device 13 stores templates of various classifications of sound events, for example, being the same as the templates stored in the audio capture device 11 as aforementioned, and a lookup table indicating whether each of the classifications of sound events belongs to the long tones or the short tones. The processing device 13 can determine the classification of the sound event according to the sound event templates, determine whether the classification of the sound event belongs to the long tones or the short tones according to the lookup table, and accordingly set the preset sampling length.

In step S23, when the length of time of the sound event is larger than a preset sampling length, the processing device 13 obtains an estimated sampling shift according to the length of time of the sound event, the preset sampling length and an upper limit of samples, wherein the upper limit of samples can be adjusted according to the current number of training audio files in the training audio file set. For example, when the number of the training audio files is sufficient (e.g. when more than 1000 raw audio files are appropriately split into more than 3000 training audio files), the upper limit of samples is set to 3, and when the number of the training audio files is insufficient, the upper limit of samples is set to 5. More particularly, the estimated sampling shift can be obtained by the processing device 13 executing the following formula:

$$S_L = \frac{E_L - W_L}{N - 1},$$

wherein $S_L$ represents the estimated sampling shift, $E_L$ represents the length of time of the sound event, $W_L$ represents the preset sampling length, and N represents the upper limit of samples.

In this embodiment, when the length of time of the sound event is less than or equal to the preset sampling length, the processing device 13 can fill the blank corresponding to the difference between the length of time of the sound event and the preset sampling length with background noise to generate a training audio file, and store the training audio file into the training audio file set. More particularly, when the length of time of the sound event is equal to the preset sampling length, the difference between the length of time of the sound event and the preset sampling length is zero, and the processing device 13 directly uses the sound event as a training audio file; when the length of time of the sound event is less than the preset sampling length, the processing device 13 can add a clip of background noise before or after the clip of the sound event, or add clips of background noise before and after the clip of the sound event, so as to compensate for the blank corresponding to the preset sampling length and generate a combined clip, and use the combined sound clip as a training audio file. For example, the background noise is from the sound clip before or after the sound event in the raw audio file. By the above method of generating a training audio file according to the sound event and the background noise, it may avoid the problem of changing the original characteristic distribution of the sound event caused by conventionally duplicating the sound event to compensate for the insufficient length of time of a training audio file.

Figure 4:
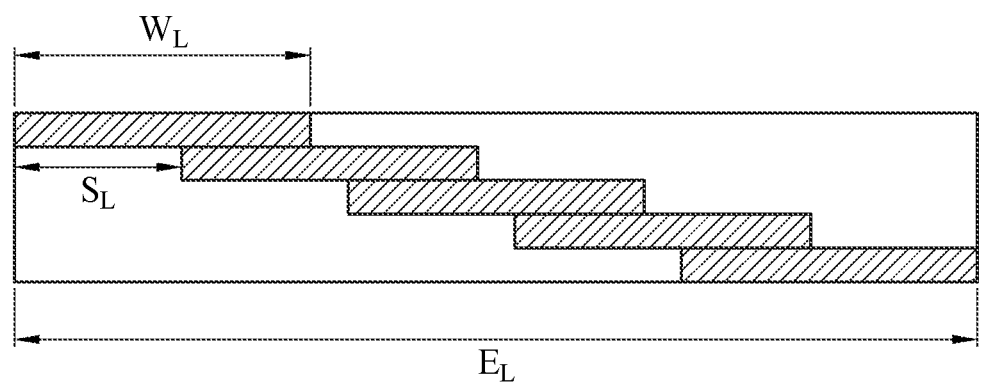
FIG. 4 is a schematic diagram of sampling of a sound event according to an embodiment of this present application.

In step S24, the processing device 13 determines whether the estimated sampling shift is larger than or equal to a shift threshold. The shift threshold is associated with the preset sampling length, and particularly one quarter of the preset sampling length, but the present application is not limited to this. When the determined result is "yes", the processing device 13 performs step S25, performing sampling on the sound event according to the preset sampling length and the estimated sampling shift to generate multiple training audio files. More particularly, please refer to FIG. 4, which is a schematic diagram of sampling of a sound event according to an embodiment of this present application. As shown in FIG. 4, the processing device 13 performs sampling on a sound event with the length of time EL using the preset sampling length WL as the length of time of each sampling unit and using the estimated sampling shift SL as the time difference between every two sampling units. In other words, the preset sampling length WL is used as the length of time of each of the training audio files, and the estimated sampling shift SL is used as the time difference between every two of the training audio files. More specifically, the time difference between every two sampling units/training audio files can indicate the time interval between the start time of the first sampling unit/training audio file and the start time of the second sampling unit/training audio file, wherein the start time can be replaced by the end time or any time between the start time and the end time, which is not limited in this present application.

Please refer to FIG. 1 and FIG. 3 again. When the determined result of step S24 is "no", the processing device 13 performs step S26, performing sampling on the sound event according to the preset sampling length and the shift threshold to generate multiple training audio files. More particularly, when the processing device 13 determines that the estimated sampling shift is less than the shift threshold, the processing device 13 uses the preset sampling length as the length of time of each sampling unit (training audio file) and replaces the estimated sampling shift by the shift threshold as the time difference between every two sampling units (training audio files). This way may avoid the problem that the built recognition model is too concentrated on specific sound characteristics caused by too short time interval between every two sampling units and too high overlap rate of training audio files.

In step S27, the processing device 13 stores at least part of the training audio files generated by step S25 or step S26 into a training audio file set. The processing device 13 can store all the generated training audio files into the training audio file set; or, the processing device 13 can further perform a volume filtering step to filter training audio files that can be stored into the training audio file set. More particularly, the processing device 13 can perform the following steps for each of the training audio files: splitting the training audio file into split results using a preset unit; determining whether the volume of each of the split results is larger than or equal to preset volume; and when more than half of the split results have the volume larger than or equal to the preset volume, inputting the training audio file to the training audio file set, and when more than half of the split results have the volume less than the preset volume, discarding the training audio file. For example, the preset unit is 64 milliseconds (ms), and the preset volume is −30 dBFS, which is equivalent to the volume of white noise. Since the collected training audio files are uneven and some of them have poor quality, resulting in insufficient signal strength and low volume, the model learning must be impacted. This problem may be avoided by the above-mentioned volume filtering step. Moreover, the processing device 13 can perform the above-mentioned volume filtering step on the sound event when obtaining the sound event in order to discard the sound event with too low volume before sampling.

In step S28, the processing device 13 trains a sound recognition model according to the training audio file set. More particularly, the processing device 13 can generate a deep learning model from at least part of the training audio files using a deep learning method, and the deep learning model serves as the sound recognition model. For example, the deep learning model is built by selecting Keras as the framework, selecting MobileNetV2 as the architecture, and using OpenVINO for acceleration. MobileNetV2 is a lightweight neural network, and in comparison with other neural networks such as VGG, ResNet, etc., MobileNetV2 has fewer parameters, faster calculation speed and better accuracy. FIG. 3 exemplarily shows that the sound recognition model training method includes steps S21-S28. In another embodiment, before step S28 is performed for training the sound recognition model, steps S21-S27 can be performed multiple times by the sound recognition model training system 1. In particular, the sound recognition model built by the above-mentioned method belongs to a small-scale deep learning model, wherein the training audio files generated by steps S21-S27 are not time related to each other, so the above-mentioned method has relatively low training complexity in comparison with a training method for a large-scale deep learning model using characteristics and time correlations as training parameters. By the sound recognition model training method provided in this disclosure and based on the concept of microservices, a large-scale deep learning model may be replaced by multiple small-scale deep learning models respectively corresponding to different classifications of sound events.

In particular, the raw audio file can include one or more sound events. When the processing device 13 determines that the raw audio file have multiple sound events, the processing device 13 can perform comparison with the preset sampling length and steps S23-S27 on each sound event to process each sound event into multiple training audio files and store the training audio files into the training audio file set, and then perform step S28 to generate the sound recognition model. The sound events included in the raw audio file may respectively belong to different classifications. The processing device 13 can determine the classification of each sound event according to the aforementioned templates of various classifications of sound events, store the training audio files corresponding to different classifications respectively into different training audio file sets. Or, besides the start and end tags of the sound event, the raw audio file further includes tags respectively indicating the classifications of the sound events for the processing device 13 to identify the classification of each sound event.

Figure 5:
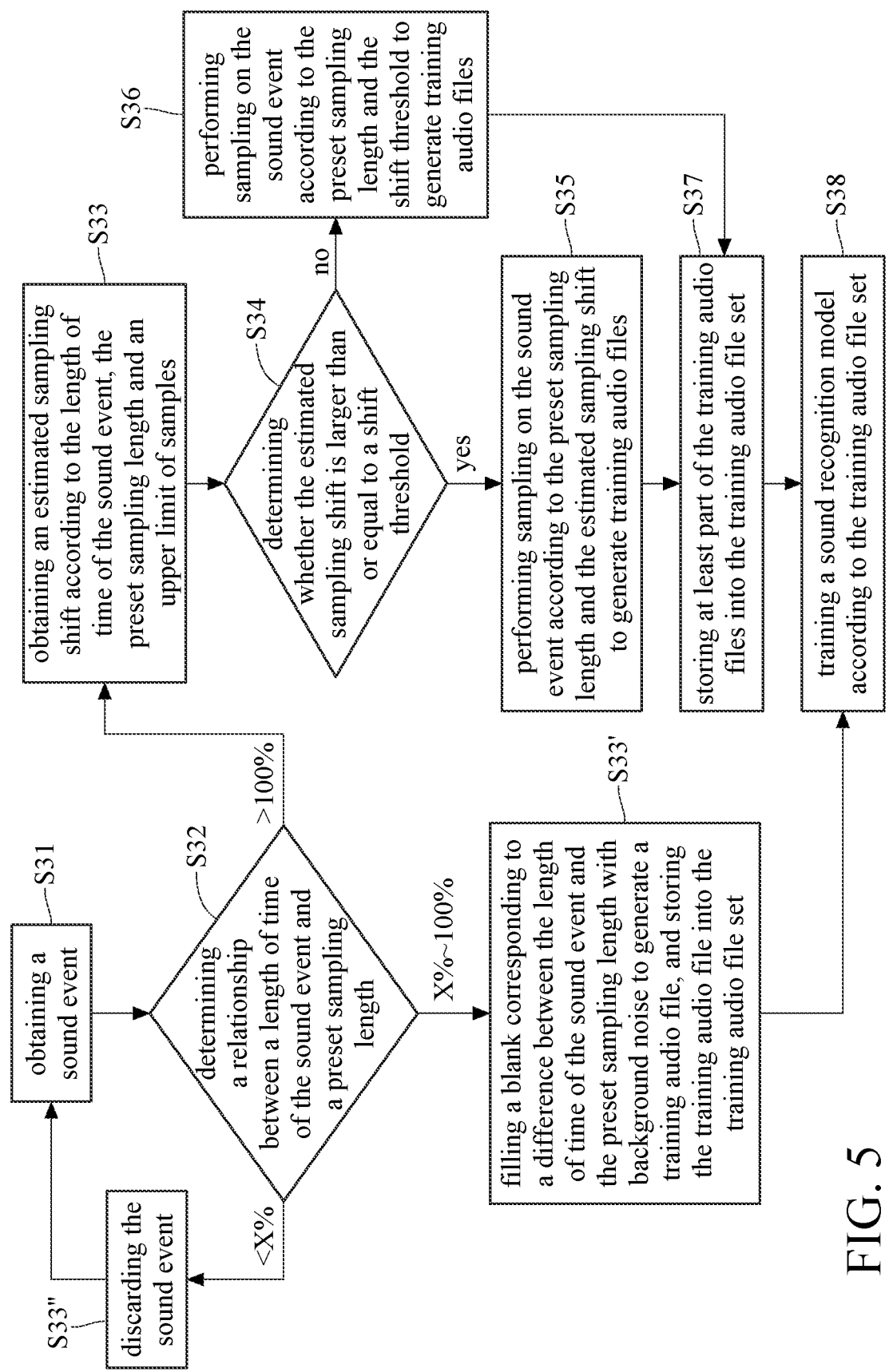
FIG. 5 is a flow chart of a sound recognition model training method according to yet another embodiment of this present application.

This present application also provides yet another embodiment of the sound recognition model training method. Please refer to FIG. 1, FIG. 3 and FIG. 5, wherein FIG. 5 is a flow chart of a sound recognition model training method according to yet another embodiment of this present application. The steps of the sound recognition model training method in FIG. 5 are approximately similar to the steps of the sound recognition model training method in FIG. 3, and can form one of implementations of the sound recognition model training method shown in FIG. 2. The steps of the sound recognition model training method in FIG. 5 can also be applied to the sound recognition model training system 1 shown in FIG. 1. In comparison with the sound recognition model training method shown in FIG. 3, the difference is that the sound recognition model training method shown in FIG. 5 compares the length of time of the sound event and the preset sampling length by determining the proportion of the length of time of the sound event to the preset sampling length, as shown in step S32, and has different processing methods respectively for multiple proportions.

When the processing device 13 determines that the length of time of the sound event is more than 100% of the preset sampling length, which indicates that the length of time of the sound event is larger than the preset sampling length, the processing device 13 performs steps S33-S38, which are the same as step S23 and the subsequent steps S24-S28 shown in FIG. 3, for training the sound recognition model. The detailed implementations are as described in the aforementioned embodiments, so they are not repeated. When the processing device 13 determines that the length of time of the sound event is between X %-100% of the preset sampling length (i.e. the length of time of the sound event is less than or equal to the preset sampling length, and larger than or equal to X % of the preset sampling length, wherein X % is a preset percentage and less than 100%), as shown in step S33', the processing device 13 can fill a blank corresponding to a difference between the length of time of the sound event and the preset sampling length to generate a training audio file, and store the training audio file into the training audio file set. More particularly, when the length of time of the sound event is equal to the preset sampling length, the difference between the length of time of the sound event and the preset sampling length is zero, and the processing device 13 directly uses the sound event as a training audio file; when the length of time of the sound event is less than the preset sampling length but larger than or equal to X % of the preset sampling length, the processing device 13 can add a clip of background noise before or after the clip of the sound event, or add clips of background noise before and after the clip of the sound event, so as to compensate for the blank corresponding to the preset sampling length and generate a combined clip, and use the combined sound clip as a training audio file. For example, the background noise is from the sound clip before or after the sound event in the raw audio file. By the above method of generating a training audio file according to the sound event and the background noise, it may avoid the problem of changing the original characteristic distribution of the sound event caused by conventionally duplicating the sound event to compensate for the insufficient length of time of a training audio file.

Then, the processing device 13 can perform step S38 as step S28 in FIG. 3 for training the sound recognition model; or, before performing step S38, the processing device 13 can instruct the audio capture device 11 to perform step S31 multiple times to obtain another sound event from the raw audio file or obtain another raw audio file, and perform the determining step S32 on said another sound event or said another raw audio file. When the processing device 13 determines that the length of time of the sound event is less than X % of the preset sampling length, the processing device 13 discards the sound event (step S33"), requests or receives another sound event from the audio capture device 11 (step S31), and then performs step S32 and the subsequent steps again. 31 In particular, preset percentage X % can be set to different values according to whether the sound event belongs to long tones or short tones, wherein the classifications of the long tones can include baby crying, dog barking, screaming, speaking, etc., and the classifications of the short tones can include alarm, vehicle horn, gunshot, glass breaking, etc. For example, when the sound event belongs to the long tones, the preset percentage is set to being in a range between 40% and 60%, and preferably set to 50%; when the sound event belongs to the short tones, the preset percentage is set to being in a range between 15% and 35%, and preferably set to 25%. Since the length of time of a short sound event is relatively short than that of along sound event, if the preset percentage for filtering short sound events is the same as that for filtering long sound events, many short sound events will be discarded. Therefore, the above-mentioned adjustment of the preset percentage may avoid the problem of collecting training audio files for a long time, which is caused by discarding too may short sound events.

The preset percentage can be set by a user through a user interface of the sound recognition model training system 1, or the processing device 13 of the sound recognition model training system 1 can determine whether the sound event belongs to the long tones or the short tones and then set the preset percentage according to the determined result. In an embodiment, the processing device 13 can determine whether the sound event belongs to the long tones or the short tones according to the length of time of the sound event. For example, the processing device 13 determines that the sound event belongs to the short tones when the length of time of the sound event is equal to or shorter than 2 seconds, and determines that the sound event belongs to the long tones when the length of time of the sound event is longer than 2 seconds. In another embodiment, besides the start and end tags of the sound event, the raw audio file further includes a tag indicating whether the sound event belongs to the long tones or the short tones, and the processing device 13 can set the preset percentage according to this tag. In yet another embodiment, the internal memory of the processing device 13 stores a lookup table indicating whether each of various classifications of sound events belongs to the long tones or the short tones. Besides the start and end tags of the sound event, the raw audio file further includes a tag indicating the classification of the sound event, and the processing device 13 can determine whether the classification of the sound event belongs to the long tones or the short tones according to this tag and the above-mentioned lookup table, and accordingly set the preset percentage. In yet another embodiment, the internal memory of the processing device 13 stores templates of various classifications of sound events and a lookup table indicating whether each of the classifications of sound events belongs to the long tones or the short tones. The processing device 13 can determine the classification of the sound event according to the sound event templates, determine whether the classification of the sound event belongs to the long tones or the short tones according to the lookup table, and accordingly set the preset percentage.

The sound recognition model trained by the sound recognition model training method described in the above embodiments can be included in a non-transitory computer-readable medium in the form of codes, wherein the non-transitory computer-readable medium is, for example, an optical disc, a flash drive, a memory card, a hard disk of a cloud server. When a processor of a computer loads the codes from this non-transitory computer-readable medium, the processor can determine the classification of a sound (sound class) according to a sound recognition model. More particularly, the processor can input the sound to be recognized into the sound recognition model to recognize the classification of the sound using the sound recognition model.

Please refer to Table 1 and Table 2, wherein Table 1 shows evaluation indices of recognition results of a sound recognition model for long sound events that is built by the sound recognition model training system and method of one of the above embodiments of this present application, and Table 2 shows evaluation indices of recognition results of a sound recognition model for short sound events that is built by the sound recognition model training system and method of one of the above embodiments of this present application. More particularly, the sound recognition models corresponding to Table 1 and Table 2 are built by the sound recognition model training method in the embodiment of FIG. 5 as aforementioned, wherein in the sound recognition model training method corresponding to Table 1, the preset sampling length is set to 4 seconds, and the preset percentage is set to 50%; in the sound recognition model training method corresponding to Table 2, the preset sampling length is set to 1 second, and the preset percentage is set to 25%. Table 1 and Table 2 each have multiple evaluation indices including precision (precision rate), recall (recall rate) and f1 score, wherein precision indicates the proportion of true positives to all the judged positives; recall indicates the proportion of true positives to all the samples that are actually positive; f1 score is a harmonic mean of precision and recall and serves as a comprehensive index of the two. Table 1 and Table 2 show that both of the sound recognition model for short sound events and the sound recognition model for long sound events that are built by the sound recognition model training system and method in this present application have good performance of sound recognition.

In view of the above description, the sound recognition model training method and system provided in this present application can build a small-scale deep learning model as a sound recognition model. In comparison with a large-scale deep learning model, the small-scale deep learning model has relatively low training complexity and relatively low development cost in the initial stage. By the specific pre-processing procedure of training audio files, the sound recognition model training method and system in this present application may have good quality of the training audio files and avoid the impact of the length of time of the sound event on the training result. Therefore, the sound recognition model built by the sound recognition model training method and system and the non-transitory computer-readable medium in this present application may have good performance of sound recognition.

What is claimed is:

1. A sound recognition model training method, comprising:
    determining a relationship between a sound event and first parameter, and deciding a second parameter in response to the relationship;
    performing sampling on the sound event using the first parameter and the second parameter to generate training audio files, wherein a length of each of the training audio files is associated with the first parameter, and a time difference between every two of the training audio files is associated with the second parameter; and
    inputting at least part of the training audio files to a sound recognition model for training the sound recognition model, wherein the sound recognition model is used for determining a sound classification.

2. The sound recognition model training method according to claim 1, wherein determining the relationship between the sound event and the first parameter, and deciding the second parameter in response to the relationship comprises:
    comparing a length of time of the sound event with the first parameter;
    when the length of time of the sound event is larger than the first parameter, obtaining an estimated parameter according to the length of time of the sound event, the first parameter and an upper limit of samples;
    determining whether the estimated parameter is larger than or equal to a shift threshold; and
    when the estimated parameter is larger than or equal to the shift threshold, using the estimated parameter as the second parameter.

3. The sound recognition model training method according to claim 2, wherein determining the relationship between the sound event and the first parameter, and deciding the second parameter in response to the relationship further comprises:
    when the estimated parameter is less than the shift threshold, using the shift threshold as the second parameter.

4. The sound recognition model training method according to claim 2, wherein the shift threshold is a quarter of the first parameter.

TABLE 1

| classification | precision | recall | f1 score | the number of test samples |
|---|---|---|---|---|
| baby crying | 0.81 | 0.84 | 0.82 | 512 |
| dog barking | 0.88 | 0.89 | 0.88 | 663 |
| screaming | 0.97 | 0.98 | 0.98 | 487 |
| specking | 0.79 | 0.81 | 0.8 | 1195 |
| other | 0.79 | 0.66 | 0.69 | 878 |
| average/total | 0.848 | 0.836 | 0.834 | 3735 |

TABLE 2

| classification | precision | recall | f1 score | the number of test samples |
|---|---|---|---|---|
| alarm | 0.74 | 0.67 | 0.7 | 268 |
| vehicle horn | 0.85 | 0.86 | 0.86 | 497 |
| glass breaking | 0.8 | 0.8 | 0.8 | 469 |
| gunshot | 0.86 | 0.9 | 0.88 | 564 |
| average/total | 0.8125 | 0.8075 | 0.81 | 1798 |

5. The sound recognition model training method according to claim 2, wherein obtaining the estimated parameter according to the length of time of the sound event, the first parameter and the upper limit of samples comprises executing a formula, wherein the formula is:

$$S_L = \frac{E_L - W_L}{N - 1},$$

wherein $S_L$ represents the estimated parameter, $E_L$ represents the length of time of the sound event, $W_L$ represents the first parameter, and N represents the upper limit of samples.

6. The sound recognition model training method according to claim 2, further comprising:
when the sound event belongs to long tones, setting the first parameter to have a first value; and
when the length of time of the sound event is less than a preset percentage of the first parameter, obtaining another sound event;
wherein the first value is a power of two, and the preset percentage is in a range between 40% and 60%.

7. The sound recognition model training method according to claim 2, further comprising:
when the sound event belongs to short tones, setting the first parameter to have a second value; and
when the length of time of the sound event is less than a preset percentage of the first parameter, obtaining another sound event;
wherein the second value is a power of two, and the preset percentage is in a range between 15% and 35%.

8. The sound recognition model training method according to claim 2, further comprising:
when the length of time of the sound event is in a range between the first parameter and a preset percentage of the first parameter, filling a blank corresponding to a difference between the length of time of the sound event and the first parameter with background noise to generate a training audio file, and inputting the training audio file to the sound recognition model for training the sound recognition model.

9. The sound recognition model training method according to claim 1, wherein inputting the at least part of the training audio files to the sound recognition model for training the sound recognition model comprises:
for each of the training audio files, performing:
splitting the training audio file into split results using a preset unit;
determining whether volume of each of the split results is larger than or equal to preset volume; and
when more than half of the split results have the volume larger than or equal to the preset volume, inputting the training audio file to the sound recognition model for training the sound recognition model.

10. A non-transitory computer-readable medium, comprising a code, wherein the code is executed by a processor to perform:
determining a sound classification according to a sound recognition model;
wherein the sound recognition model is trained by the sound recognition model training method according to claim 1.

11. A sound recognition model training system, comprising:
an audio capture device configured for obtaining a sound event;
a processing device connected with the audio capture device, and is configured for:
determining a relationship between a sound event and first parameter, and deciding a second parameter in response to the relationship;
performing sampling on the sound event using the first parameter and the second parameter to generate training audio files, wherein a length of each of the training audio files is associated with the first parameter, and a time difference between every two of the training audio files is associated with the second parameter; and
inputting at least part of the training audio files to a sound recognition model for training the sound recognition model, wherein the sound recognition model is used for determining a sound classification; and
a storage device connected with the processing device, and configured for storing the sound recognition model.

12. The sound recognition model training system according to claim 11, wherein determining the relationship between the sound event and the first parameter, and deciding the second parameter in response to the relationship performed by the processing device comprises:
comparing a length of time of the sound event with the first parameter;
when the length of time of the sound event is larger than the first parameter, obtaining an estimated parameter according to the length of time of the sound event, the first parameter and an upper limit of samples;
determining whether the estimated parameter is larger than or equal to a shift threshold; and
when the estimated parameter is larger than or equal to the shift threshold, using the estimated parameter as the second parameter.

13. The sound recognition model training system according to claim 12, wherein determining the relationship between the sound event and the first parameter, and deciding the second parameter in response to the relationship performed by the processing device further comprises: when the estimated parameter is less than the shift threshold, using the shift threshold as the second parameter.

14. The sound recognition model training system according to claim 12, wherein the shift threshold is a quarter of the first parameter.

15. The sound recognition model training system according to claim 12, wherein the processing device obtains the estimated parameter by executing a formula, wherein the formula is:

$$S_L = \frac{E_L - W_L}{N - 1},$$

wherein $S_L$ represents the estimated parameter, $E_L$ represents the length of time of the sound event, $W_L$ represents the first parameter, and N represents the upper limit of samples.

16. The sound recognition model training system according to claim 12, wherein the processing device further sets the first parameter to have a first value when the sound event belongs to long tones, and obtains another sound event when the length of time of the sound event is less than a preset percentage of the first parameter, wherein the first value is a power of two, and the preset percentage is in a range between 40% and 60%.

17. The sound recognition model training system according to claim 12, wherein the processing device further sets the first parameter to have a second value when the sound event belongs to short tones, and obtains another sound event when the length of time of the sound event is less than a preset percentage of the first parameter, wherein the second value is a power of two, and the preset percentage is in a range between 15% and 35%.

18. The sound recognition model training system according to claim 12, wherein the processing device further fills a blank corresponding to a difference between the length of time of the sound event and the first parameter with background noise to generate a training audio file, and inputs the training audio file to the sound recognition model for training the sound recognition model when the length of time of the sound event is in a range between the first parameter and a preset percentage of the first parameter.

19. The sound recognition model training system according to claim 11, wherein inputting the at least part of the training audio files to the sound recognition model for training the sound recognition model performed by the processing device comprises:
   for each of the training audio files, performing:
      splitting the training audio file into split results using a preset unit;
      determining whether volume of each of the split results is larger than or equal to preset volume; and
      when more than half of the split results have the volume larger than or equal to the preset volume, inputting the training audio file to the sound recognition model for training the sound recognition model.

* * * * *